Dec. 11, 1934.  C. H. SUMENIUS  1,984,241

SELF BINDING WIRE CLAMP

Filed March 12, 1934

Carl H. Sumenius
INVENTOR

BY Victor J. Evans & Co.
ATTORNEY

Patented Dec. 11, 1934

1,984,241

UNITED STATES PATENT OFFICE 1,984,241

SELF-BINDING WIRE CLAMP

Carl H. Sumenius, Brooklyn, N. Y.

Application March 12, 1934, Serial No. 715,227

3 Claims. (Cl. 24—115)

This invention relates to cable clamps of the self-binding type wherein the tension of a span of cable effects the holding action of the clamp.

An object of my invention is to provide a simple and economical self-binding clamp to rapidly fasten the end of a span of electrical conductor wire, rope and the like securely to a rigid structure.

Another object is to provide a clamp to secure the ends of an electrical insulated cable span wherein the holding action of the clamp will not damage the cable insulation.

A further object of my invention is the provision of a cable fastener which may be hooked into a closed loop or screw eye and which will permit the fastening of a slack loop of cable as is required in some electrical installations.

The invention will be fully and comprehensively understood from a consideration of the following detailed description when read in connection with the accompanying drawing which forms part of the application, with the understanding, however, that the improvement is capable of extended application and is not confined to the exact showing of the drawing nor to the precise construction described and, therefore, such changes and modifications may be made therein as do not affect the spirit of the invention nor exceed the scope thereof as expressed in the appended claims.

In describing the invention in detail and the particular physical embodiment illustrating the invention, reference is had to the accompanying drawing wherein like characters of reference designate corresponding parts thruout the several views.

Figure 1:
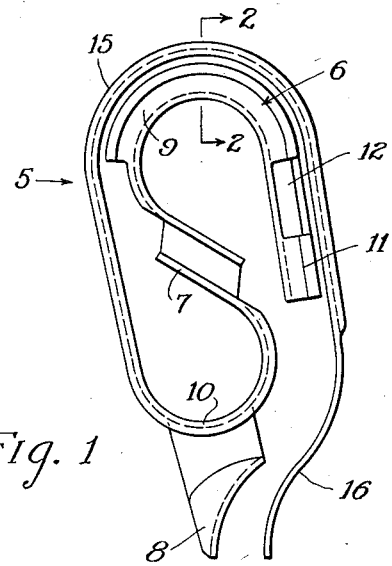
Fig. 1 is a side elevational view of the cable clamp before it is installed.
Figure 2:
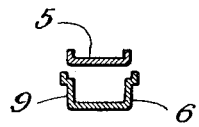
Fig. 2 is a section on line 2—2 of Fig. 1.
Figure 3:
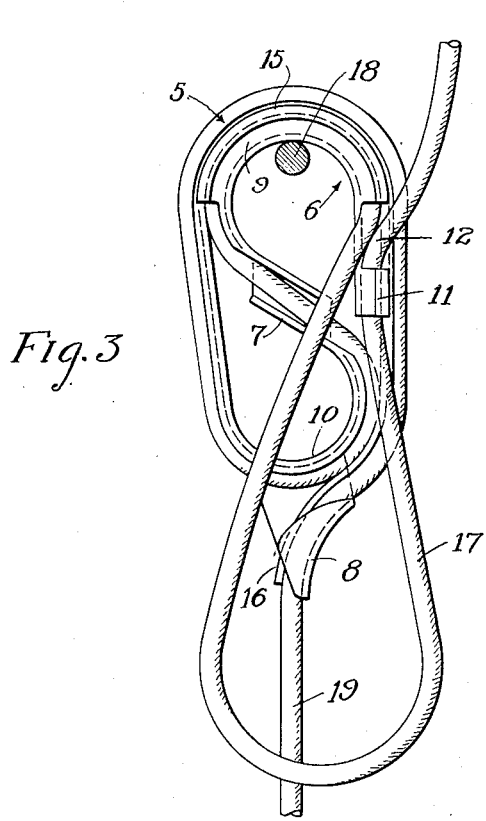
Fig. 3 is a side elevational view of the cable clamp installed with the cable in place on the clamp and providing a slack loop.

Referring to the drawing for a more detailed description thereof, numeral 5 indicates an outer loop of the clamp which is connected to the inner loop 6 by the channel member 7. The inner loop 6 comprises a U-shaped semi-circular portion 9 extending tangentially and terminating in a U-shaped holder 11. Intermediate the semi-circular portion 9 and the loop holder 11 is an aperture 12 formed by removing a portion of the proximal wall of the tangential extension. The outer loop 5 is substantially of the section shown in Fig. 2 and of a contour comprising a substantially semi-circular portion 15 having two tangential extensions, the left hand extensions continuing in a curvature 10 which terminates at the junction of the channel member 7. The right hand extension terminates in a reverse bend hereinafter referred to as the terminal retainer 16. The terminal guide 8 is affixed to the curved portion 10 of the outer loop 5. In regard to the installation of the cable clamp of my invention, reference is made to Fig. 3 in which a slack loop is shown as indicated by numeral 17. The installation is as follows: Numeral 18 indicates a section of a screw eye which has been attached to a rigid structure. The cable clamp is hooked over the screw eye 18 by engaging the screw eye 18 between the terminal retainer 16 and the terminal guide 8, separated as shown in Fig. 1, and moving the cable clamp until the screw eye is in position as shown in Fig. 3, that is, against the semi-circular portion 9 of the clamp.

The cable is now installed in the clamp as follows: The span 19 of the cable is manually supported while the loose end of the cable is wound around the entire periphery of the outer loop 5, thru the channel member 7 into the U-shaped semi-circular portion 9 of the inner loop 6. The cable is then brought out of the U-shaped member 9 thru the aperture 12 and the slack loop 17 is then formed, the terminal end of which is passed into the loop holder 11. The terminal retainer 16 and the portion of the cable contacting same are now hooked over the terminal guide 8 and the cable span tension is released. This tension of the cable span acting against the normal resilience of the outer loop 5 causes its semi-circular portion 15 to contact with and press against the inner loop of the cable retained within the semi-circular portion 9 of the inner loop 6. In this fashion the increase in the tension of the cable span 19 effects a greater pressure against the inner loop of the cable, thus locking it securely.

Figure 4:
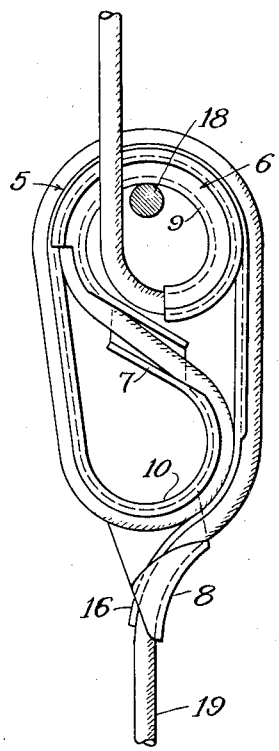
Fig. 4 is a side elevational view of a modified form of cable clamp installed with the wire in place, in which the slack loop is not required.

In the modified form of cable clamp, as shown in Fig. 4, the installation of which is made substantially as previously described, no loop is required. Therefore the tangential extension of the inner loop 6 and the loop holder 11 have been omitted. The terminal end of the cable is brought out of the wire clamp at the right side of the inner loop 6.

What is claimed as new is:

1. A clamp comprising inner and outer loop portions each adapted to support on its outer surface a portion of a wire formed into inner and outer loops, the outer loop portion being movable by tension of the wire towards the inner loop portion to clamp the inner loop of the wire between the inner and outer loop portions.

2. A clamp comprising inner and outer loop portions each adapted to support on its outer surface a portion of a wire formed into inner and outer loops, the outer loop portion being movable by tension of the wire towards the inner loop portion to clamp the inner loop of the wire between the inner and outer loop portions, said outer loop portion being resilient.

3. A clamp comprising inner and outer loop portions each adapted to support on its outer surface a portion of a wire formed into inner and outer loops, the outer loop portion being movable by tension of the wire towards the inner loop portion to clamp the inner loop of the wire between the inner and outer loop portions, said outer loop portion being resilient, a guide for the wire secured to the outer loop and a spring for holding the wire in the guide.

CARL H. SUMENIUS.